US010754643B2

(12) United States Patent
Arquero et al.

(10) Patent No.: US 10,754,643 B2
(45) Date of Patent: Aug. 25, 2020

(54) DETECTING SOFTWARE INCOMPATIBILITIES WITHIN A SYSTEM STACK

(71) Applicant: International Business Machines Corporation, Armonk, NY (US)

(72) Inventors: Gregg M. Arquero, White Plains, NY (US); Steven N. Burchfield, Woodstock, NY (US); Syed F. Hossain, Hopewell Junction, NY (US); Joshua Schaeffer, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/835,709

(22) Filed: Dec. 8, 2017

(65) Prior Publication Data

US 2019/0179630 A1  Jun. 13, 2019

(51) Int. Cl.
| | |
|---|---|
| *G06F 9/44* | (2018.01) |
| *G06F 8/71* | (2018.01) |
| *G06F 8/41* | (2018.01) |
| *G06F 11/34* | (2006.01) |
| *G06F 11/36* | (2006.01) |

(52) U.S. Cl.
CPC ............. *G06F 8/71* (2013.01); *G06F 8/433* (2013.01); *G06F 11/3457* (2013.01); *G06F 11/3476* (2013.01); *G06F 11/3604* (2013.01); *G06F 11/3668* (2013.01); *G06F 2201/865* (2013.01)

(58) Field of Classification Search
CPC ...................................................... G06F 8/71
See application file for complete search history.

(56) References Cited

U.S. PATENT DOCUMENTS

| | | | |
|---|---|---|---|
| 5,193,185 A | 3/1993 | Lanter | |
| 6,243,833 B1 | 6/2001 | Hitchcock et al. | |
| 9,026,996 B2 | 5/2015 | Ramachandran | |
| 9,170,809 B1 | 10/2015 | Cohen et al. | |
| 9,195,455 B2 | 11/2015 | Sriram et al. | |
| 2002/0062369 A1* | 5/2002 | von Klopp | H04L 43/50 709/224 |
| 2002/0129338 A1* | 9/2002 | MacDonell | G06F 8/71 717/126 |
| 2003/0144990 A1 | 7/2003 | Benelisha et al. | |
| 2007/0245015 A1* | 10/2007 | Raisoni | H04L 43/12 709/224 |
| 2013/0185708 A1* | 7/2013 | Bhat | G06F 9/44552 717/170 |
| 2013/0219371 A1* | 8/2013 | Masser | G06F 11/3466 717/128 |

(Continued)

*Primary Examiner* — Hang Pan
(74) *Attorney, Agent, or Firm* — Cantor Colburn LLP; Teddi Maranzano

(57) ABSTRACT

Embodiments of the invention are directed to methods and systems for detecting incompatibilities in a computer system. The method includes logging incoming requests to a target component; receiving changes to the target component; analyzing the changed target component; performing a simulation to determine the compatibility of the target component with respect to one or more other components, and upon the finding of an incompatibility causing a notification.

19 Claims, 4 Drawing Sheets

(56) References Cited

U.S. PATENT DOCUMENTS

| | | | |
|---|---|---|---|
| 2014/0281732 A1* | 9/2014 | Elias | G06F 11/3692 |
| | | | 714/38.1 |
| 2015/0003960 A1 | 2/2015 | Gowdra et al. | |
| 2015/0254163 A1* | 9/2015 | Baril | G06F 11/3636 |
| | | | 714/38.1 |

* cited by examiner

DETECTING SOFTWARE INCOMPATIBILITIES WITHIN A SYSTEM STACK

BACKGROUND

The present invention relates in general to the field of computing. More specifically, the present invention relates to systems and methodologies for detecting software incompatibilities within a system stack.

In modern computing systems, computer software is occasionally updated for a variety of reasons. The software might be updated to provide additional functionality, to maintain compatibility with new versions of an operating system, or to fix various issues. A change to one piece of software can impact other pieces of software or other hardware, sometimes in manners not readily foreseeable. A software developer can be interested in seeing how their changes affect other portions of a computer system.

SUMMARY

Embodiments of the invention are directed to methods and systems for detecting incompatibilities in a computer system. The method includes logging incoming requests to a target component; receiving changes to the target component; applying the changes to the target component to create a changed target component; analyzing the changed target component; performing a simulation to determine the compatibility of the target component with respect to one or more other components, and upon a finding of an incompatibility causing a notification.

Embodiments of the present invention are further directed to a computer system for recommending software updates. The system includes a memory and a processor system communicatively coupled to the memory. The processor is configured to perform a method that includes logging incoming requests to a target component; receiving changes to the target component; applying the changes to the target component to create a changed target component; analyzing the changed target component; performing a simulation to determine compatibility of the target component with respect to one or more other components; and upon a finding of an incompatibility causing a notification.

Embodiments of the invention are directed to methods and systems for detecting incompatibilities in a computer system. The method includes installing a target component onto a computer system; logging incoming requests to the target component; analyzing the target component to determine compatibility of the target component with respect to one or more other components of the computer system; upon a finding of an incompatibility determining severity of the incompatibility; and providing one or more recommendations for alleviating the incompatibility based on the determined severity.

Additional features and advantages are realized through techniques described herein. Other embodiments and aspects are described in detail herein. For a better understanding, refer to the description and to the drawings.

BRIEF DESCRIPTION OF THE DRAWINGS

The subject matter that is regarded as embodiments is particularly pointed out and distinctly claimed in the claims at the conclusion of the specification. The foregoing and other features and advantages of the embodiments are apparent from the following detailed description taken in conjunction with the accompanying drawings in which:

DETAILED DESCRIPTION

Figure 1:
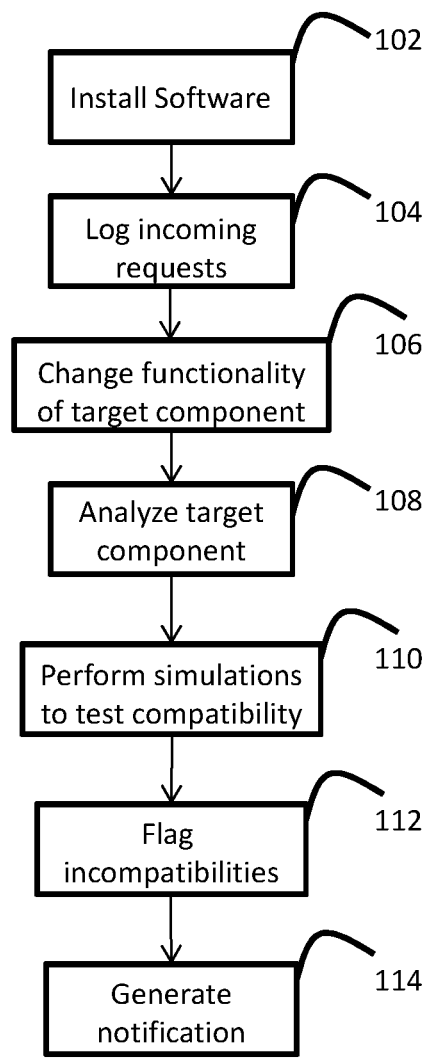
FIG. 1 is a flow diagram illustrating the operation of one or more embodiments of the present invention.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of embodiments of the invention, as described above, computer systems include both hardware and software. The software can include both an operating system and application programs. Software is periodically updated for a variety of different reasons. Commonly, those reasons can include the addition of new features, support of new hardware, and bug fixes that solve various issues with the software.

In a computer system (also known as a "system stack") with many software components communicating with each other and with hardware, it can be difficult to assess a change to a first software component will have on any other software component when. Other components (both software and hardware) may rely on specific defaults, application program interface (API) outputs, memory sizes, and the like. Making a change to the first software component can cause incompatibilities to other components that expect a different behavior from the first software component. If incompatibilities are not accounted for, there is a possibility that one or more pieces of software will not operate properly.

Turning now to an overview of the aspects of embodiments of the invention, one or more embodiments of the invention address the above-described shortcomings of the prior art by logging and collecting communications between the first software component and other components operating on the system stack and analyzing code changes to detect potential incompatibilities.

A flowchart illustrating method 100 is presented in FIG. 1. Method 100 is merely exemplary and is not limited to the embodiments presented herein. Method 100 can be employed in many different embodiments or examples not specifically depicted or described herein. In some embodiments, the procedures, processes, and/or activities of method 100 can be performed in the order presented. In other embodiments, one or more of the procedures, processes, and/or activities of method 100 can be combined or skipped. In one or more embodiments, method 100 is performed by a processor as it is executing instructions. In some embodiments, method 100 is performed by computer system 300.

Software is installed on a computer system (block 102). The installed software is software capable of operating an embodiment. In some embodiments, the computer system resembles a production environment. "A production environment" is a computer system with a configuration similar to that of computer systems that a component will be installed on. Sometimes, software developers use specialized systems to code their components, where the specialized system might not be similar to the systems in which the component will be installed. A production environment is a computer system that is closer to the type of computer system that a user will use with the component.

The software is configured to log incoming requests to the target component (block 104). In some embodiments, more than one component can be chosen as the target component. In some embodiments, the logging can be configured to occur only for a specified period of time. The incoming requests can include what macros, APIs, and functions are being called and the parameters used when called. In some embodiments, the type of requests being logged can be configured. Some developers might not desire the level of granularity provided by logging each function call and may only desire logging of APIs. In some embodiments, the results of each call also can be logged. The specified time also can be adjusted. All calls made during the specified time can be collected. The information collected can include the calling component's name, the parameters to the requesting function, and the results returned to calling component. In addition, there can be a configurable collection of arbitrary information available at the time of the call.

As the developers make changes to the functionality of the target component (block 106), an analysis of the target component is made (block 108), and simulations are executed to test the compatibility of the changes against previously logged requests (block 110). The analysis determines changes to the functions, APIs, and service calls. The simulations detect potential impact to other components. The simulations are performed using the parameters gathered in block 104. Using the simulations, an embodiment can determine if another component will receive unexpected results from their call to the target component. The unexpected result can be deemed an "incompatibility."

If an incompatibility is found it is flagged for investigation (block 112), and a notification is generated (block 114). The notification can inform a developer of the incompatibility. In some embodiments, the notification can include details as to exactly what functions are causing the incompatibility. In addition, the notification can include suggestions as to how to alleviate the incompatibility.

Figure 2:
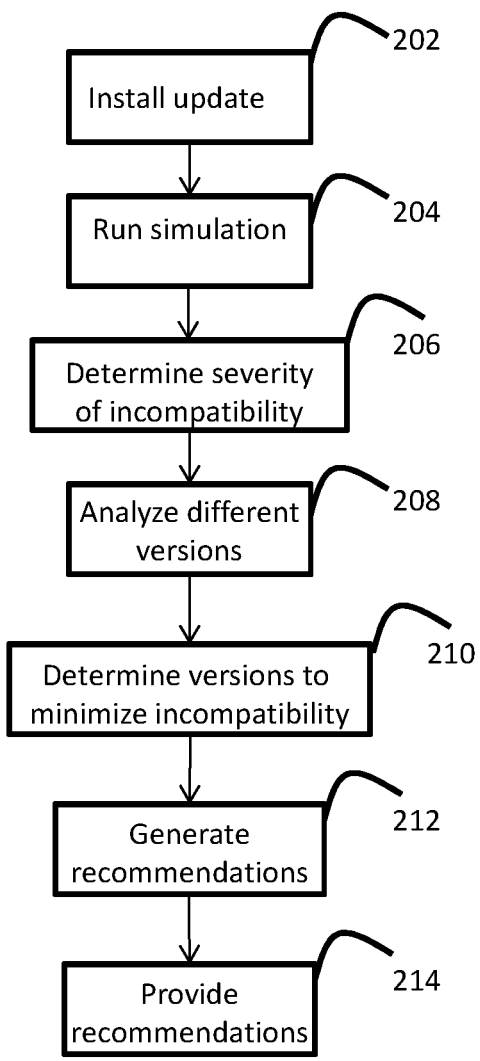
FIG. 2 is a flow diagram illustrating the operation of one or more embodiments of the present invention.

In some embodiments, a user can determine a severity of an incompatibility for a potential component update. A flowchart illustrating method 200 is presented in FIG. 2. Method 200 is merely exemplary and is not limited to the embodiments presented herein. Method 200 can be employed in many different embodiments or examples not specifically depicted or described herein. In some embodiments, the procedures, processes, and/or activities of method 200 can be performed in the order presented. In other embodiments, one or more of the procedures, processes, and/or activities of method 200 can be combined or skipped. In one or more embodiments, method 200 is performed by a processor as it is executing instructions. In some embodiments, method 200 is performed by computer system 300.

A software update (also known as a patch or a target component) is initiated onto a system (block 202). A simulation is run (using, for example, a method described with respect to FIG. 1) (block 204). If an incompatible change is detected, then a severity of the incompatibility is determined (block 206). For example, if the affected component merely returns a different error message, the incompatibility can be noted as a low-severity incompatibility. But if the incompatibility affects serialized resources in multiple locations, it could be noted as a high-severity incompatibility. In some embodiments, the severity can be assigned a score. If the severity is above a certain threshold, the software is determined to be high-severity. In some instances, if the severity is high enough, the system can block the install from being completed.

In addition to detecting compatibility issues, different versions of conflicting components can be analyzed (block 208). Analyzing different versions can include a variety of different tasks. For example, multiple versions can be analyzed to find a version with no incompatibilities. In other words, if a newer version introduced an incompatibility, it can be determined at what point in the process it was last compatible.

Thereafter, suggestions can be determined as to versions of components that will create the least amount of incompatibility (block 210). This can be accomplished by obtaining multiple versions of the components and performing simulations with each version of the conflicting components. A score can be assigned and the lowest score can be chosen as the versions that create the least amount of incompatibility. Thereafter, suggestions can be generated for upgrading or downgrading one or more of the conflicting components to minimize any incompatibilities (block 212). The generated suggestions can be provided to the user (block 214).

Figure 3:
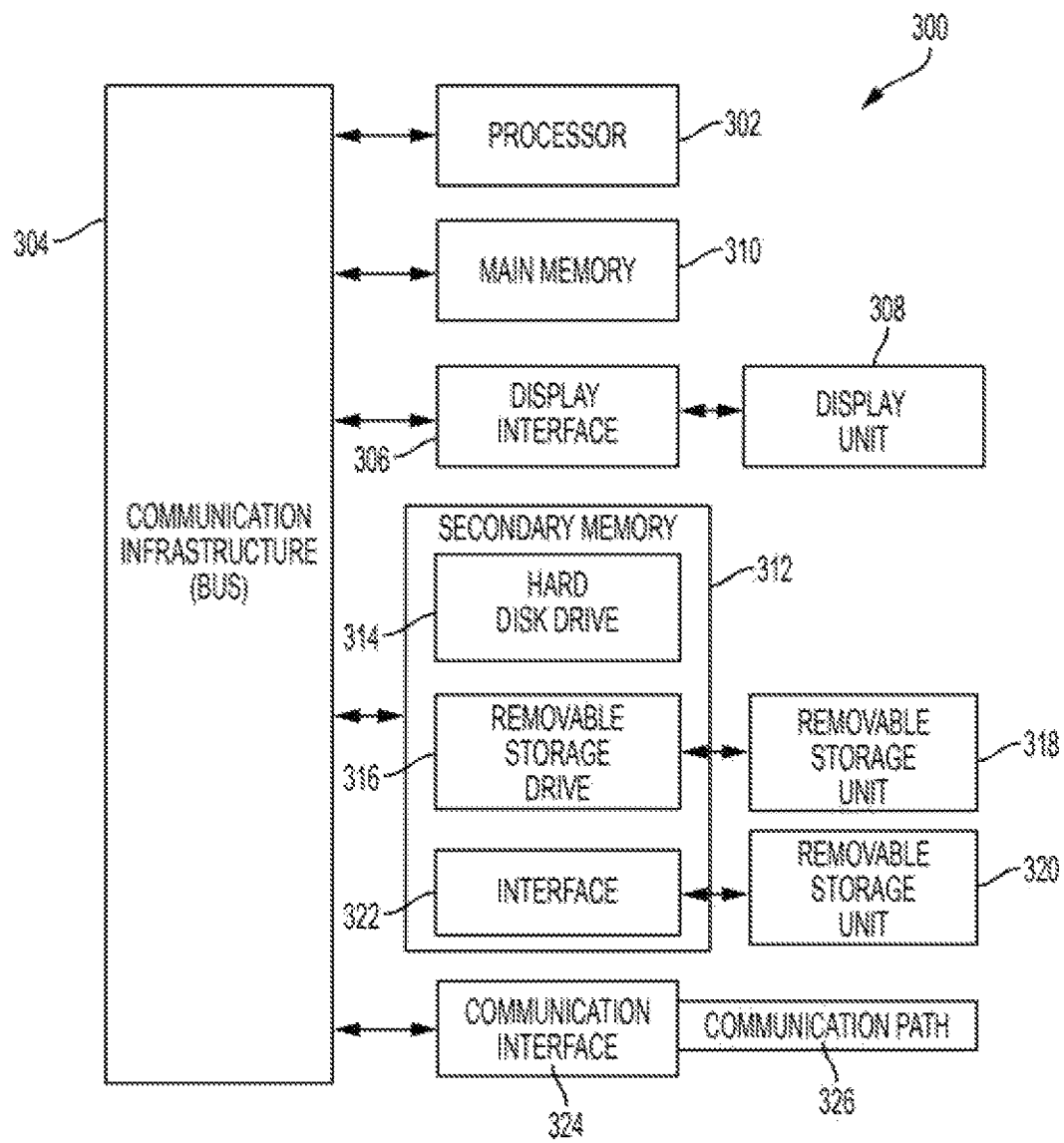
FIG. 3 is a block diagram of a computer system that can be used to implement one or more embodiments.

FIG. 3 depicts a high-level block diagram of a computer system 300, which can be used to implement one or more embodiments. More specifically, computer system 300 can be used to implement hardware components of systems capable of performing methods described herein. Although one exemplary computer system 300 is shown, computer system 300 includes a communication path 326, which connects computer system 300 to additional systems (not depicted) and can include one or more wide area networks (WANs) and/or local area networks (LANs) such as the Internet, intranet(s), and/or wireless communication network(s). Computer system 300 and additional system are in communication via communication path 326, e.g., to communicate data between them.

Computer system 300 includes one or more processors, such as processor 302. Processor 302 is connected to a communication infrastructure 304 (e.g., a communications bus, cross-over bar, or network). Computer system 300 can include a display interface 306 that forwards graphics, textual content, and other data from communication infrastructure 304 (or from a frame buffer not shown) for display on a display unit 308. Computer system 300 also includes a main memory 310, preferably random access memory (RAM), and can also include a secondary memory 3120. Secondary memory 312 can include, for example, a hard disk drive 314 and/or a removable storage drive 316, representing, for example, a floppy disk drive, a magnetic tape drive, or an optical disc drive. Hard disk drive 314 can be in the form of a solid state drive (SSD), a traditional magnetic disk drive, or a hybrid of the two. There also can be more than one hard disk drive 314 contained within secondary memory 312. Removable storage drive 316 reads from and/or writes to a removable storage unit 318 in a manner well known to those having ordinary skill in the art. Removable storage unit 318 represents, for example, a floppy disk, a compact disc, a magnetic tape, or an optical disc, etc. which is read by and written to by removable storage drive 316. As will be appreciated, removable storage unit 318 includes a computer-readable medium having stored therein computer software and/or data.

In alternative embodiments, secondary memory 312 can include other similar means for allowing computer programs or other instructions to be loaded into the computer system. Such means can include, for example, a removable storage unit 320 and an interface 322. Examples of such means can include a program package and package interface (such as that found in video game devices), a removable memory chip (such as an EPROM, secure digital card (SD card), compact flash card (CF card), universal serial bus (USB) memory, or PROM) and associated socket, and other removable storage units 320 and interfaces 322 which allow software and data to be transferred from the removable storage unit 320 to computer system 300.

Computer system 300 can also include a communications interface 324. Communications interface 324 allows software and data to be transferred between the computer system and external devices. Examples of communications interface 324 can include a modem, a network interface (such as an Ethernet card), a communications port, or a PC card slot and card, a universal serial bus port (USB), and the like. Software and data transferred via communications interface 324 are in the form of signals that can be, for example, electronic, electromagnetic, optical, or other signals capable of being received by communications interface 324. These signals are provided to communications interface 324 via a communication path (i.e., channel) 326. Communication path 326 carries signals and can be implemented using wire or cable, fiber optics, a phone line, a cellular phone link, an RF link, and/or other communications channels.

In the present description, the terms "computer program medium," "computer usable medium," and "computer-readable medium" are used to refer to media such as main memory 310 and secondary memory 312, removable storage drive 316, and a hard disk installed in hard disk drive 314. Computer programs (also called computer control logic) are stored in main memory 310 and/or secondary memory 312. Computer programs also can be received via communications interface 324. Such computer programs, when run, enable the computer system to perform the features discussed herein. In particular, the computer programs, when run, enable processor 302 to perform the features of the computer system. Accordingly, such computer programs represent controllers of the computer system. Thus it can be seen from the foregoing detailed description that one or more embodiments provide technical benefits and advantages.

Figure 4:
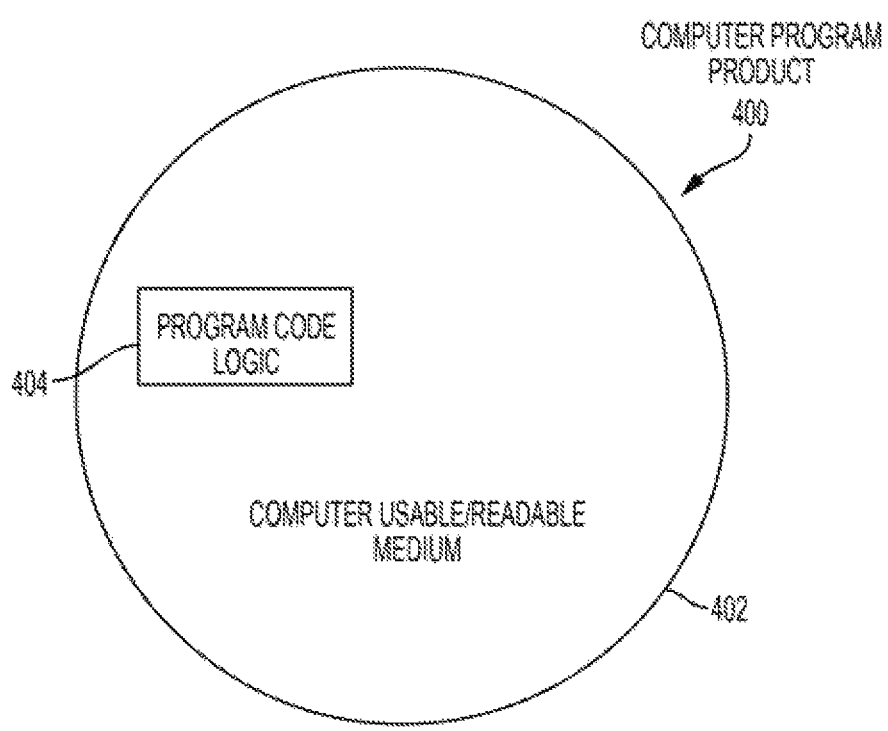
FIG. 4 is a block diagram illustrating a computer program product that can be used to implement one or more embodiments.

Referring now to FIG. 4, a computer program product 400 in accordance with an embodiment that includes a computer-readable storage medium 402 and program instructions 404 is generally shown.

Embodiments can be a system, a method, and/or a computer program product. The computer program product can include a computer-readable storage medium (or media) having computer-readable program instructions thereon for causing a processor to carry out aspects of embodiments of the present invention.

The computer-readable storage medium can be a tangible device that can retain and store instructions for use by an instruction execution device. The computer-readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out embodiments can include assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer-readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer-readable program instructions by utilizing state information of the computer-readable program instructions to personalize the electronic circuitry, in order to perform embodiments of the present invention.

Aspects of various embodiments are described herein with reference to flowchart illustrations and/or block diagrams of methods, apparatus (systems), and computer program products according to various embodiments. It will be understood that each block of the flowchart illustrations and/or block diagrams, and combinations of blocks in the flowchart illustrations and/or block diagrams, can be implemented by computer-readable program instructions.

These computer-readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions can also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The descriptions presented herein are for purposes of illustration and description, but is not intended to be exhaustive or limited. Many modifications and variations will be apparent to those of ordinary skill in the art without departing from the scope and spirit of embodiments of the invention. The embodiment was chosen and described in order to best explain the principles of operation and the practical application, and to enable others of ordinary skill in the art to understand embodiments of the present invention for various embodiments with various modifications as are suited to the particular use contemplated.

What is claimed is:

1. A computer-implemented method for detecting incompatibilities in a computer system, the method comprising:
   logging incoming requests to a target component, wherein the logging of incoming requests is configurable by a user to only log selected types of calls to the target component, wherein the types of calls comprise one or more selected macros, application program interfaces (APIs) and functions;
   receiving changes to the target component;
   applying the changes to the target component to create a changed target component;
   analyzing the changed target component;
   performing a simulation based on previously logged incoming requests and the changed target component to determine compatibility of the changed target component with respect to one or more other components, wherein the changed target component and the one or more other components operate on a system stack of the computer system, wherein performing the simulation comprises determining an impact of the changes to the target component on the one or more other components by determining whether one or more other components will receive unexpected results from a call to the changed target component; and upon a finding of an incompatibility causing a notification, wherein the notification indicates what functions are causing the incompatibility and provides one or more suggestions for alleviating the incompatibility.

2. The computer-implemented method of claim 1 wherein:
logging incoming requests comprises determining one or more calls to the target component, and parameters used in the one or more calls.

3. The computer-implemented method of claim 2 wherein:
logging incoming requests further comprises determining results of the one or more calls to the target component.

4. The computer-implemented method of claim 3 wherein:
analyzing the changed target component comprises:
determining changes to the target component; and
performing a simulation to determine results of the one or more calls to the changed target component.

5. The computer-implemented method of claim 3 wherein:
logging incoming requests further comprises setting a time-limit for the logging.

6. The computer-implemented method of claim 1 further comprising:
upon the finding of an incompatibility, determining a severity of the incompatibility.

7. The computer-implemented method of claim 6 further comprising:
preventing the changes to the target component if the severity of the incompatibility exceeds a threshold.

8. A computer system for detecting incompatibilities, the computer system comprising:
a memory; and
a processor system communicatively coupled to the memory;
the processor system configured to perform a method comprising:
logging incoming requests to a target component, wherein the logging of incoming requests is configurable by a user to only log selected types of calls to the target component, wherein the types of calls comprise one or more selected macros, application program interfaces (APIs) and functions;
receiving changes to the target component;
applying the changes to the target component to create a changed target component;
analyzing the changed target component;
performing a simulation based on previously logged incoming requests and the changed target component to determine compatibility of the changed target component with respect to one or more other components, wherein the changed target component and the one or more other components operate on a system stack of the computer system, wherein performing the simulation comprises determining an impact of the changes to the target component on the one or more other components by determining whether one or more other components will receive unexpected results from a call to the changed target component; and
upon a finding of an incompatibility causing a notification, wherein the notification indicates what functions are causing the incompatibility and provides one or more suggestions for alleviating the incompatibility.

9. The computer system of claim 8 wherein:
logging incoming requests comprises determining one or more calls to the target component, and parameters used in the one or more calls.

10. The computer system of claim 9 wherein:
logging incoming requests further comprises determining results of the one or more calls to the target component.

11. The computer system of claim 10 wherein:
analyzing the changed target component comprises:
determining changes to the target component; and
performing a simulation to determine results of the one or more calls to the changed target component.

12. The computer system of claim 10 wherein:
logging incoming requests further comprises setting a time-limit for the logging.

13. The computer system of claim 8 wherein the processor system is further configured to: upon the finding of an incompatibility, determining a severity of the incompatibility pending.

14. A computer-implemented method for detecting incompatibilities in a computer system, the method comprising:
installing a target component onto a computer system;
logging incoming requests to the target component, wherein the logging of incoming requests is configurable by a user to only log selected types of calls to the target component, wherein the types of calls comprise one or more selected macros, application program interfaces (APIs) and functions;
analyzing the target component to determine compatibility of the target component with respect to one or more other components of the computer system based on previously logged incoming requests and the target component, wherein the target component and the one or more other components operate on a system stack of the computer system, wherein determining compatibility of the target component with respect to one or more other components comprises determining an impact of changes to the target component on the one or more other components by determining whether one or more other components will receive unexpected results from a call to the target component;
upon a finding of an incompatibility, causing a notification that indicates what functions are causing the incompatibility and determining severity of the incompatibility; and
providing one or more recommendations for alleviating the incompatibility based on the determined severity.

15. The computer-implemented method of claim 14 wherein:
logging incoming requests comprises:
determining one or more calls to the target component, and parameters used in the one or more calls; and
logging incoming requests further comprises determining results of the one or more calls to the target component.

16. The computer-implemented method of claim 15 wherein:
   analyzing the target component comprises:
      performing a simulation to determine results of the one or more calls to the target component.

17. The computer-implemented method of claim 16 wherein:
   determining severity comprises using the results of calls to the target component to determine if an incompatibility is of low-severity or high-severity.

18. The computer-implemented method of claim 17 wherein:
   providing one or more recommendations comprises determining optimum versions of components to install to minimize incompatibility.

19. The computer-implemented method of claim 17 further comprising:
   preventing installation of the target component if severity exceeds a threshold.

* * * * *